United States Patent
Decore et al.

(10) Patent No.: US 6,350,948 B1
(45) Date of Patent: Feb. 26, 2002

(54) SUPPORT WITH MULTIPART TRUNKING COVER PORTION FOR EQUIPMENT TO BE PLACED ALONG TRUNKING

(75) Inventors: Raphaël Decore, Parennes; David Piole, Avoise, both of (FR)

(73) Assignees: Legrand; Legrand SNC, both of (FR)

(*) Notice: Subject to any disclaimer, the term of this patent is extended or adjusted under 35 U.S.C. 154(b) by 0 days.

(21) Appl. No.: 09/448,889

(22) Filed: Nov. 29, 1999

(30) Foreign Application Priority Data

Nov. 27, 1998 (FR) .............................. 98 14941

(51) Int. Cl.⁷ ................................. H02G 3/04
(52) U.S. Cl. .......................... 174/48; 174/49; 174/50; 202/3.2; 202/3.3
(58) Field of Search ................. 174/48, 50, 58, 174/60, 67, 49, 68.3; 220/3.2, 3.8, 4.02, 242, 3.3, 3.92, 3.94; 52/220.3, 220.7

(56) References Cited

U.S. PATENT DOCUMENTS

| | | | |
|---|---|---|---|
| 2,987,690 A | * 6/1961 | Marbais | 174/67 |
| 3,721,762 A | * 3/1973 | Gooding | 174/48 |
| 3,786,171 A | * 1/1974 | Shira | 174/48 |
| 4,874,322 A | * 10/1989 | Dola et al. | 174/49 |
| 5,277,007 A | * 1/1994 | Hellwig et al. | 174/48 |
| 5,486,650 A | * 1/1996 | Yetter | 174/53 |
| 5,614,695 A | * 3/1997 | Benito Navazo | 174/48 |
| 5,629,496 A | * 5/1997 | Navazo et al. | 174/48 |
| 5,726,387 A | * 3/1998 | Teinturier et al. | 174/68.3 |
| 5,792,992 A | * 8/1998 | Handler | 174/48 |
| 5,861,576 A | * 1/1999 | Langston et al. | 174/48 |
| 5,942,724 A | * 8/1999 | Russo et al. | 174/48 |
| 5,981,872 A | * 11/1999 | Decore et al. | 174/48 |
| 5,998,732 A | * 12/1999 | Cavaney et al. | 174/48 |

FOREIGN PATENT DOCUMENTS

| | | |
|---|---|---|
| EP | 0 159 554 | 10/1985 |
| EP | 0 239 456 | 9/1987 |
| EP | 0 267 079 | 5/1988 |

* cited by examiner

*Primary Examiner*—Dean A. Reichard
*Assistant Examiner*—Angel R. Estrada
(74) *Attorney, Agent, or Firm*—Young & Thompson

(57) ABSTRACT

A support for equipment to be disposed along trunking projecting from a wall includes a body attached to the wall and forming a casing for the equipment which has an opening along its side intended to adjoin the trunking. A trunking cover portion extends from the body, in corresponding relationship to the opening, and covers the trunking locally. The trunking cover portion is formed of at least two separate parts staggered lengthwise across the width of the trunking, disposed end-to-end relative to each other and joining to each other at a junction surface substantially parallel to the opening of the body. Applications include trunking with a relatively small width or height.

14 Claims, 4 Drawing Sheets

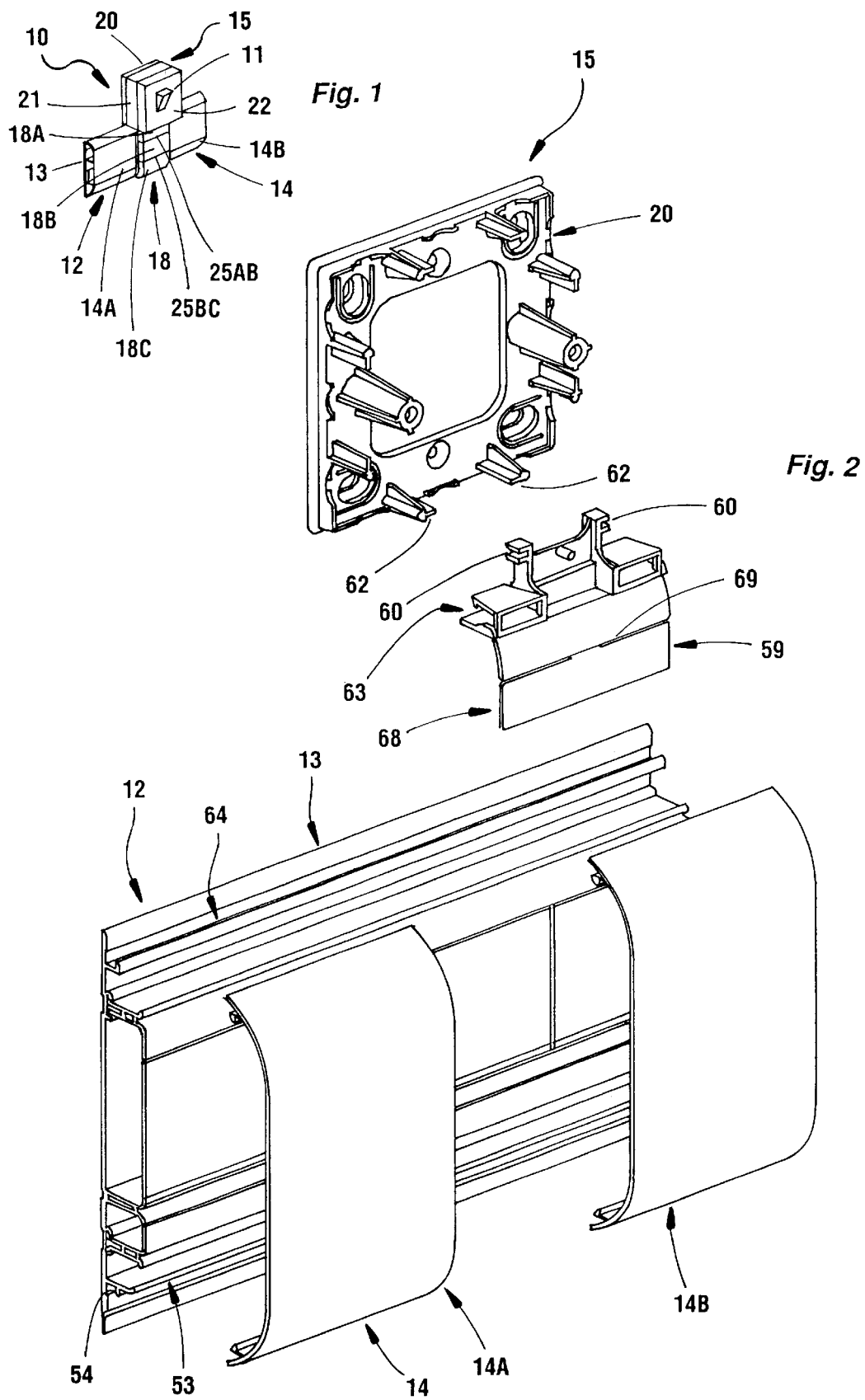

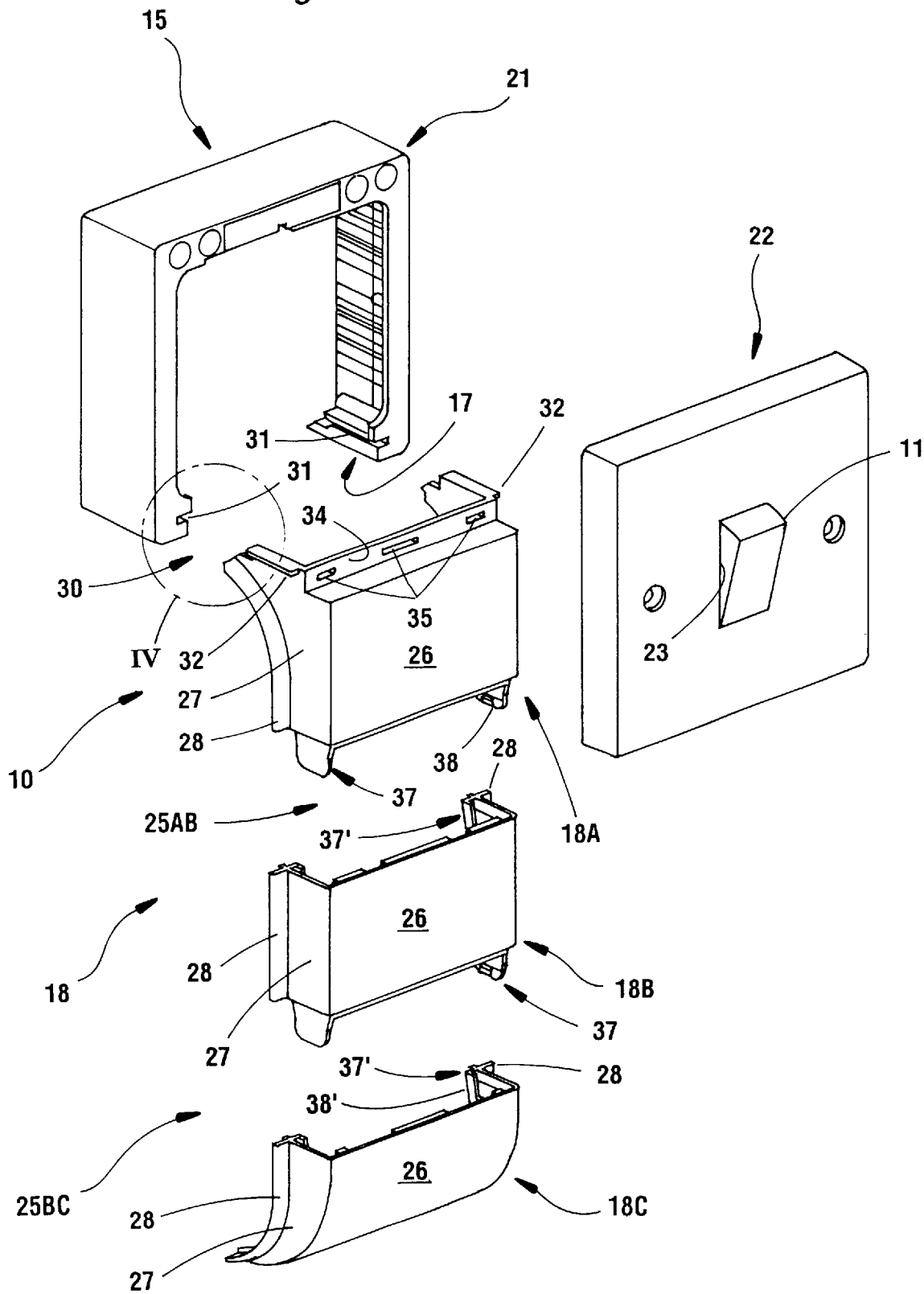

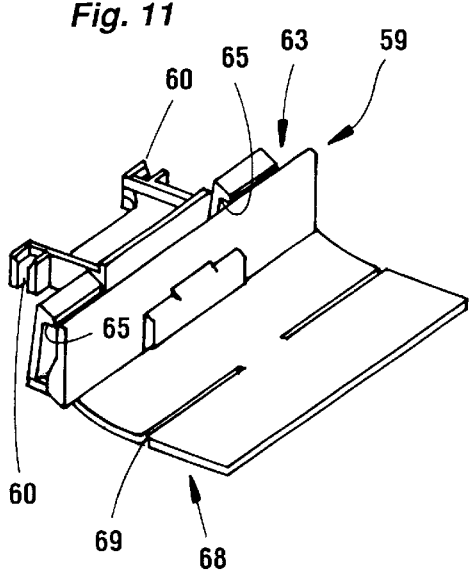
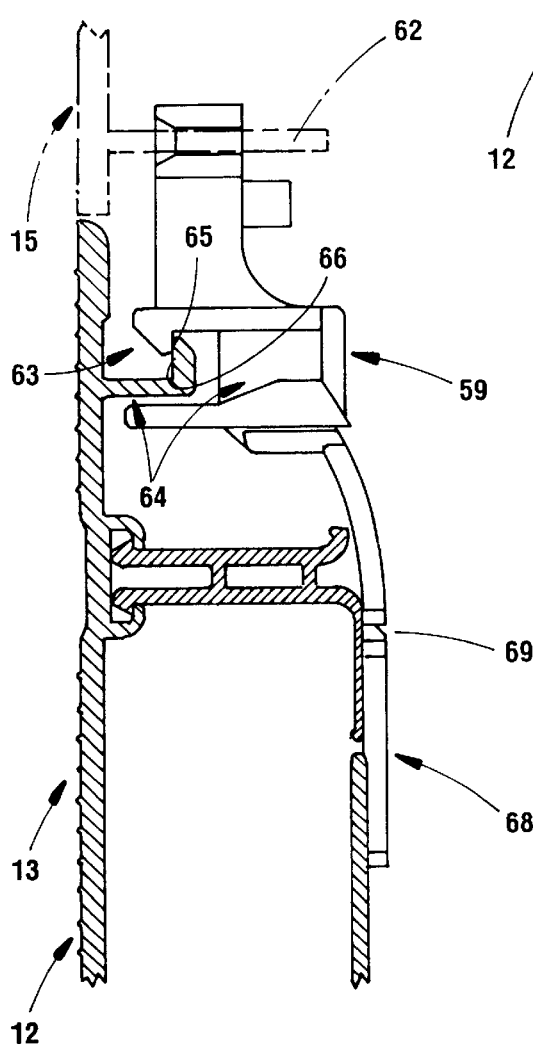
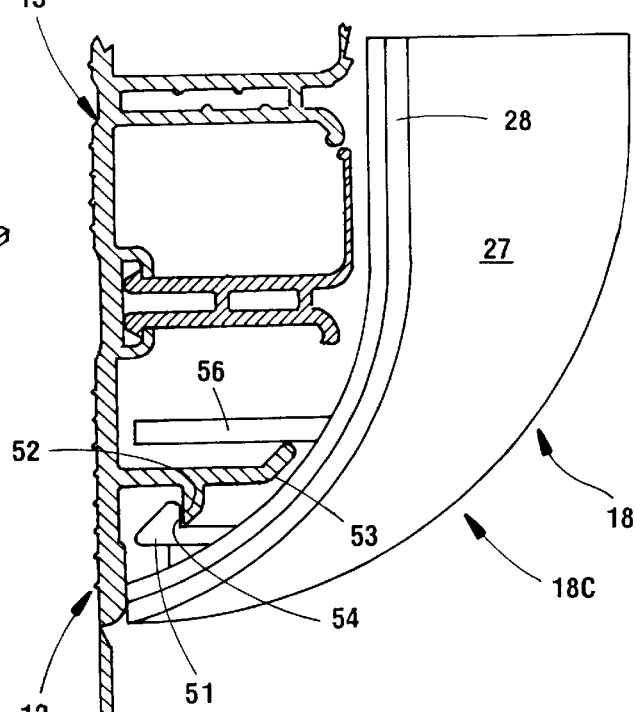
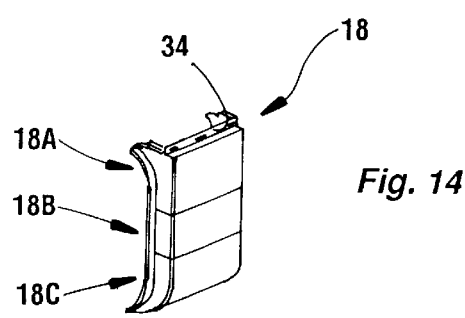
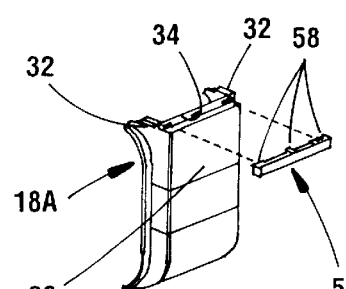
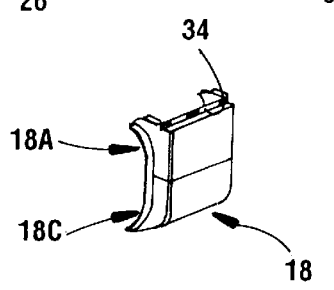

SUPPORT WITH MULTIPART TRUNKING COVER PORTION FOR EQUIPMENT TO BE PLACED ALONG TRUNKING

BACKGROUND OF THE INVENTION

1. Field of the Invention

The present invention is generally concerned with supports for equipment to be placed along trunking projecting from a wall, the trunking running along the bottom of the wall as a baseboard, for example, and is more particularly, although not necessarily exclusively, directed to the situation in which the trunking, usually referred to in this case as a "molding", has relatively small dimensions and in particular a relatively small width, usually referred to as its height.

2. Description of the Prior Art

The trunking houses and protects conductors or other forms of connections to the equipment concerned and the transition of the conductors or connections from the trunking to the corresponding support must be organized in such a way that their protection is uninterrupted.

To this end the supports usually employed include a body which is designed to be attached to the wall and to form a casing for the equipment concerned and which has an opening along the side intended to adjoin the trunking, and a trunking cover portion, sometimes referred to as a "drawer", extending from the body, in corresponding relationship to the opening therein and adapted to cover the trunking locally, in practise extending transversely to the trunking.

One problem encountered in this situation is that the various designs of trunking that can be used can have different widths or heights.

In European patent 0 159 554 the trunking cover portion is in one piece with the body and removable spacers are used between the body and the trunking, according to the width or height of the trunking.

Apart from the fact that this arrangement is not very favorable from the esthetic point of view, it is difficult to apply when there is a relatively large range of widths or heights of trunking.

The body of the support, and therefore the equipment carried by the latter, is then at a relatively great distance from the trunking when the latter is narrow or low, which is not very favorable from the esthetic point of view either.

In European patent 0 239 456, the trunking cover portion is separate from the support body and its position relative to the body is adjustable so that its position can be adjusted to suit the width or height of the trunking.

Although this arrangement has proved satisfactory, in particular from the esthetic point of view, and may continue to do so, it has the disadvantage that in practise the installer must cut away the trunking cover portion to remove the surplus that would otherwise remain inside the body.

A general object of the present invention is an arrangement which avoids the above drawbacks.

SUMMARY OF THE INVENTION

To be more precise, the present invention consists in a support for equipment to be disposed along trunking projecting from a wall, the support including a body adapted to be attached to the wall and to form a casing for the equipment and which has an opening along its side intended to adjoin the trunking and a trunking cover portion extending from the body, in corresponding relationship to the opening thereof, adapted to cover the trunking locally and formed of at least two separate parts staggered lengthwise across the width of the trunking, disposed end-to-end relative to each other and joining to each other at a junction surface substantially parallel to the opening of the body.

Accordingly, depending on the width or height of the trunking, it suffices to insert between these two parts, which then form the end parts of the trunking cover portion, one or more intermediate parts each forming an extension.

The result is great flexibility of use without compromising the aesthetic effect.

The features and advantages of the invention will emerge further from the following description given by way of example and with reference to the accompanying diagrammatic drawings.

BRIEF DESCRIPTION OF THE DRAWINGS

FIG. 1, which is intentionally rendered to a relatively small scale, is a perspective view of a support in accordance with the invention shown in place alongside trunking.

FIG. 2 is an exploded perspective view to a larger scale of the trunking and part of the support in accordance with the invention.

FIG. 3 is an exploded perspective view of the remaining part of the support in accordance with the invention.

FIG. 11 is a perspective view of a positioning member on the inside of the support in accordance with the invention, seen from below.

FIG. 12 is a view of the trunking and of the positioning member to a larger scale and in partial cross section in the case of the trunking and end-on in the case of the positioning member.

FIG. 13 is a view similar to FIG. 12 of the trunking and part of the trunking cover portion of the support in accordance with the invention, in cross section in the case of the trunking and end-on in the case of the part of the trunking cover portion.

FIG. 14 is a perspective view to a smaller scale of the trunking cover portion of the support in accordance with the invention, showing a first configuration of the trunking cover portion.

FIG. 15 is a perspective view analogous to that of FIG. 14 showing how the trunking cover portion is used.

FIG. 16 is a perspective view, also analogous to that of FIG. 14, showing another configuration of the trunking cover portion of the support in accordance with the invention.

DETAILED DESCRIPTION OF THE PREFERRED EMBODIMENTS

Figure 4:
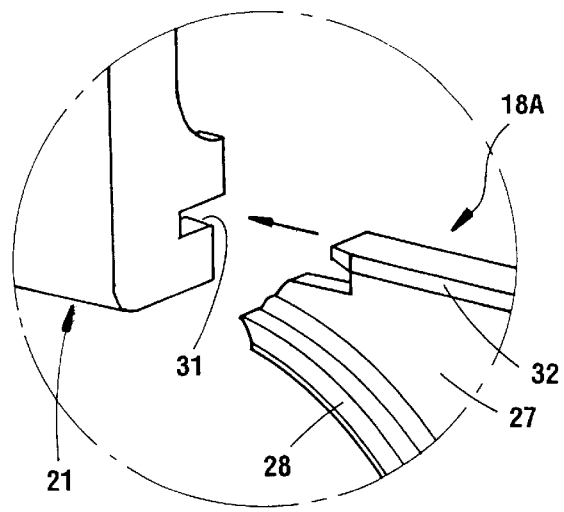
FIG. 4 shows to a larger scale the detail from FIG. 3 marked by the frame IV in FIG. 3.
Figure 5:
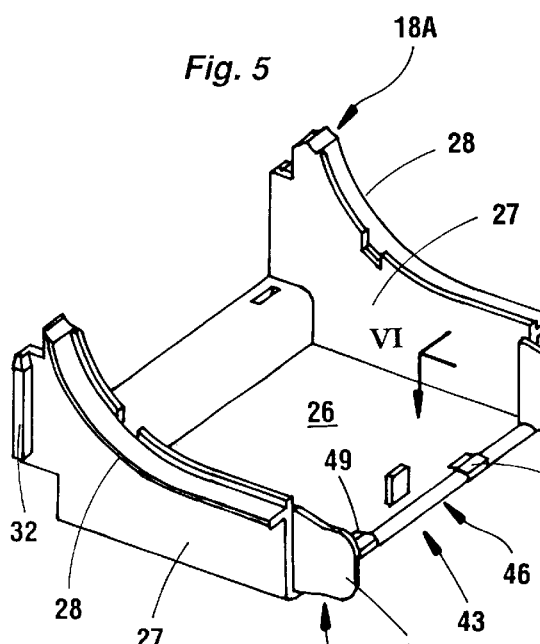
FIG. 5 is a perspective view of one of the component parts of the trunking cover portion of the support in accordance with the invention, seen from the inside.

As is well known in the art, the support 10 in accordance with the invention is designed to house equipment, for example electrical equipment.

To be more precise, in the embodiment shown, it houses an electrical switch.

Because an electrical switch of this kind is not in itself relevant to the present invention it is not shown in full in the figures and is not described here.

Only the rocker 11 operating the switch is shown on the front of the switch in FIGS. 1 and 3.

As is also well known in the art, the support 10 in accordance with the invention is designed to be placed along trunking 12 projecting from a wall, not shown, and housing connections or electrical conductors, also not shown.

The trunking 12 is also not relevant in itself to the present invention and is not described in detail here either.

Suffice to say that it includes a base section 13 adapted to be attached to the wall and a cover 14 adapted to be attached, for example clipped, to the base section 13.

Finally, in a manner that is well known in the art, the support 10 in accordance with the invention includes a body 15 designed to be attached to the wall and adapted to form a casing for the equipment and which has an opening 17 along the side intended to adjoin the trunking 12 and a trunking cover portion 18 extending from the body 15, in corresponding relationship to the opening 17 therein, and adapted to cover the trunking 12 locally.

To be more precise, the trunking cover portion 18 extends transversely to the base section 13 of the trunking 12, instead of the cover 14, i.e. between two successive sections 14A, 14B of the cover.

For the most part, the body 15 of the support 10 in accordance with the invention is also not in itself relevant to the present invention and is therefore not described in detail here.

Only its parts necessary to understanding the invention are described here.

In the embodiment shown, the body 15 is generally parallelepipedal and includes a plate 20 (see FIGS. 1 and 2) adapted to be attached to the wall, a cover 21 (see FIGS. 1 and 3) which incorporates the opening 17 and which is otherwise in the general form of a frame, and a front face 22 (see FIGS. 1 and 3) which forms a cover with a central opening 23 through which the rocker 11 passes.

In accordance with the invention, and as seen more clearly in FIG. 3, the trunking cover portion 18 of the support 10 in accordance with the invention is formed of at least two separate parts 18A, 18B, 18C staggered in their lengthwise direction across the width of the trunking 12, to be more precise across the width of the base section thereof, being disposed end-to-end relative to each other and joining at a junction surface 25AB, 25BC substantially parallel to the opening 17 of the body 15.

As shown in FIGS. 1 to 15, for example, the trunking cover portion 18 is formed of at least three parts 18A, 18B, 18C, namely two end parts 18A, 18C and at least one intermediate part 18B forming an extension.

Each part 18A, 18B, 18C of the trunking cover portion 18 has a U-shaped cross section with a middle portion 26 and two lateral flanges 27.

In the embodiments shown, the middle portion 26 is substantially plane in the part 18A nearest the body 15 and in the intermediate part 18B.

However, in the part 18C at the greatest distance from the body 15 it is curved, like the cover 14.

In the embodiments shown, the lateral flanges 27 are substantially perpendicular to the middle portion 26.

The lateral flanges 27 of the intermediate part 18B have a substantially rectangular contour.

In the end parts 18A, 18C, their contour matches the profile of the cover 14.

In the embodiments shown there is an outwardly projecting rim 28 perpendicular to the lateral flanges 27, in the manner of a visor, along the free edge of each of the lateral flanges 27 and therefore along the particular profile of each of the parts 18A, 18B, 18C.

In the embodiments shown, the part 18A of the trunking cover portion 18 nearest the body 15 is separate therefrom.

As is the case in these embodiments, positioning means 30 are preferably provided between the body 15 of the support 10 and the part 18A of the trunking cover portion 18.

As shown here, for example, the positioning means 30 include two grooves 31 on the body 15, to be more precise on its cover 21, running along respective lateral edges of its opening 17, facing each other, and, in corresponding relationship thereto, two ribs 32 on the part 18A concerned of the trunking cover portion 18 and by means of which the part 18A interengages with the grooves 31 on the body 15.

In practise, in the embodiments shown, the ribs 32 project at right angles, back to back, from the corresponding transverse edges of the lateral flanges 27 of the part 18A of the trunking cover portion 18 over its full height.

For reasons that will become apparent hereinafter, the middle portion 26 of the part 18A forms a recessed seat 34 along its corresponding free edge with spaced openings 35 in it.

As in the embodiments shown, complementary assembly means 37, 37' are preferably provided on the two end parts 18A, 18C of the trunking cover portion 18, the assembly means 37, 37' being of a first type 37 on one end part 18A, 18C, here the end part 18A nearest the body 15, and of a second type 37' on the other end part 18A, 18C, and thus here on the end part 18C at the greatest distance from the body 15.

The intermediate part 18B has assembly means of the first type 37 at one end, here at the end of the end part 18C at the greatest distance from the body 15, and assembly means of the second type 37' at the other end, and therefore at the end of the end part 18A nearest the body 15.

In the embodiments shown, the assembly means 37, 37' are substantially parallel to the thickness of the parts 18A, 18B, 18C concerned of the trunking cover portion 18, to be more precise substantially parallel to the thickness of their lateral flanges 27.

For example, the assembly means of the first type 37 include at least one male nesting member 38 and the assembly means of the second type 37' include at least one female nesting member 38' complementary to the previously mentioned male nesting member 38 and in corresponding relationship thereto.

In practise the assembly means of the first type 37 include two male nesting members 38, one on each lateral flange 27 of the parts 18A, 18B of the trunking cover portion 18.

The assembly means of the second type 37' include two female nesting members 38', one on each lateral flange 27 of the parts 18B, 18C of the trunking cover portion 18.

Figure 6:
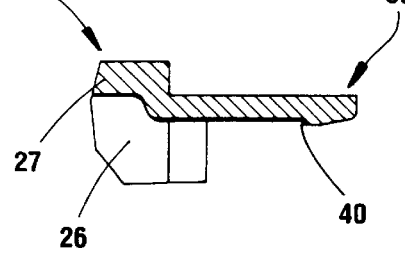
FIG. 6 is a partial view of this part of the trunking cover portion in section taken along the line VI—VI in FIG. 5.
Figure 7:
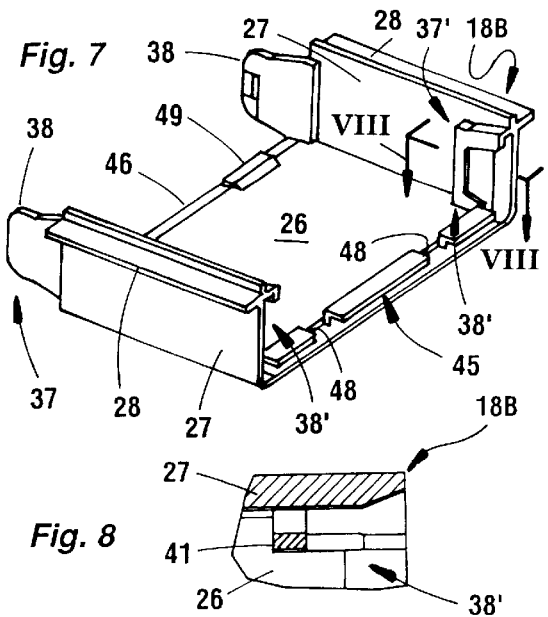
FIG. 7 is a perspective view of another part that can be incorporated into the trunking cover portion of the support in accordance with the invention, to the same scale as in FIG. 5 and with the same orientation.
Figure 10:
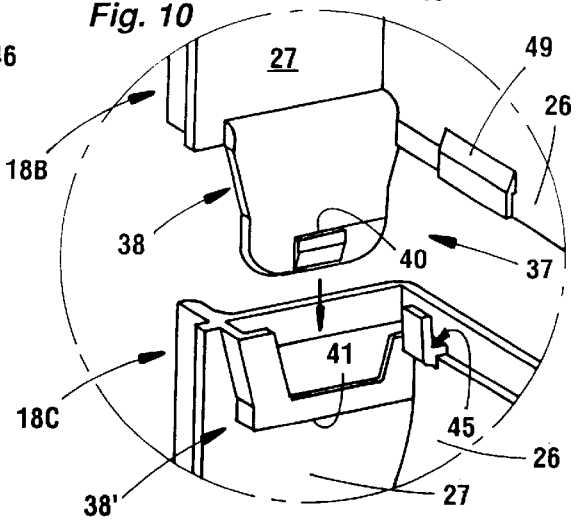
FIG. 10 is a partial perspective view to a larger scale showing the assembly of two component parts of the trunking cover portion of the support in accordance with the invention.

As seen better in FIGS. 6 and 10, a male nesting member 38 is in the form of an elastically deformable lug with a clipping detent 40 in the vicinity of its free end.

Figure 8:
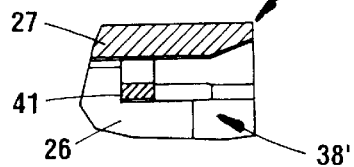
FIG. 8 is a partial view of this other part to a larger scale and in section taken along the line VIII—VIII in FIG. 7.
Figure 9:
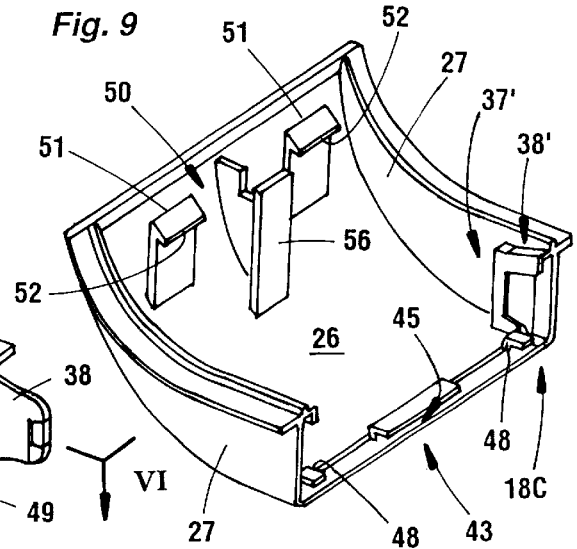
FIG. 9 is a perspective view of another part of the trunking cover portion of the support in accordance with the invention, to the same scale as FIG. 5 and with the same orientation.

As seen better in FIGS. 8 and 10, a female nesting member 38' is in the general form of a backless pocket whose free edge 41 forms a clipping detent over which the clipping detent 40 of the corresponding male nesting member 38 clips.

As is the case in the embodiments shown, at least two of the parts 18A, 18B, 18C of the trunking cover portion 18 to be butt-jointed preferably include engagement means 43 on at least a portion of the contour of the corresponding junction surface 25AB, 25BC.

As shown here, for example, the engagement means 43 include a rebate 45 on one of the parts 18A, 18B, 18C concerned and a tongue 46 on the other part 18A, 18B, 18C by means of which it is interengaged with the rebate 45 on the first mentioned part 18A, 18B, 18C.

In the embodiments shown, the tongue 46 is formed directly by the corresponding edge of the part 18A, 18B, 18C concerned.

A tongue 46 of this kind is provided only on the parts 18A, 18B in the embodiments shown in FIGS. 1 to 15 and only on the part 18A in the embodiment shown in FIG. 16.

To be more precise, in those embodiments, the tongue 46 is formed by the corresponding edge of the middle portion 26 of the parts 18A, 18B, extending from one to the other of the two associated male or female nesting members 38, 38'.

In practise, in the embodiments shown, the end part 18A of the trunking cover portion 18 forms a tongue 46 at the same end as the intermediate part 18B, the intermediate part 18B forms a rebate 45 at the same end as the end part 18A and a tongue 46 at the same end as the end part 18C, and the end part 18C forms a rebate 45 at the same end as the intermediate part 18B.

For molding technology reasons which do not need to be explained here, in the embodiments shown, each tongue 46 carries at least one localized projecting boss 49 and each rebate 45 is at least locally interrupted by a notch 48 in corresponding relationship to and the same width as the aforementioned boss 49, in order to nest over it.

As shown here, for example, each tongue 46 has two spaced locally projecting bosses 49 and each rebate 45 is locally interrupted by two notches 48 in corresponding relationship thereto.

In the embodiment shown, the notches 48 and the bosses 49 have different lengths on one and other of the parts 18A, 18B, 18C.

It follows from the foregoing description that, in the embodiments shown, the assembly means 37, 37' alternate with the engagement means 43, the assembly means 37, 37', to be more precise their male or female nesting members 38 or 38', extend along the lateral flanges 27 of the parts 18A, 18B concerned of the trunking cover portion 18, and the engagement means 43, to be more precise the rebate 45 or the tongue 46 constituting them, extend along their middle portion 26.

It also follows from the foregoing description that, in the embodiments shown, the parts 18A, 18B, 18C of the trunking cover portion 18 have engagement means on only a portion of the contour of the corresponding junction surface 25AB, 25BC, here the one corresponding to the edge of their middle portion 26.

In the embodiments shown, the part 18C of the trunking cover portion 18 at the greatest distance from the body 15 has clipping means 50 projecting from its bottom surface, to be more precise from the bottom surface of its middle portion 26, adapted to hook onto the base section 13 of the trunking 12 concerned.

As shown here, for example, the clipping means 50 include two spaced elastically deformable lugs 51 each of which has a clipping detent 52, the base section 13 of the trunking 12 having a clipping detent 54 in corresponding relationship thereto on a rib 53.

In the embodiment shown, an abutment flange 56 parallel to and spaced from the elastically deformable lugs 51 is adapted to take up a position on the other side of the rib 53 of the base section 13 of the trunking 12 relative to the elastically deformable lugs 51 (see FIG. 13).

In the embodiments shown, and for reasons that will become apparent hereinafter, the part 18A of the trunking cover portion 18 nearest the body 15 is associated with a strip 57 adapted to overlie the end part 18A, to be more precise the seat 34 formed by its middle portion 26, between the ribs 32 thereof (see FIG. 15).

For nesting with the end part 18A, the strip 57 has spaced projecting pegs 58 for clipping it into the openings 35 of the end part 18A.

In the embodiments shown, the body 15 is associated with a positioning member 59 adapted to be interengaged with the body 15 and with the base section 13 of the trunking 12 concerned.

As shown here, for example, the positioning member 59 includes two back-to-back grooves 60 adapted to interengage with two projecting ribs 62 provided for this purpose on the plate 20 of the body 15 and a groove 63 whose orientation is globally orthogonal to that of the previously mentioned grooves 60 and adapted to interengage with a projecting rib 64 also provided for this purpose on the base section 13 of the trunking 12.

As is the case in the embodiment shown, one flank of the groove 63 preferably includes a clipping detent 65 hooking over a clipping detent 66 on the rib 64 on the base section 13 of the trunking 12.

In the embodiment shown, the positioning member 59 has an integral web 68 adapted to form a separator in the trunking 12 concerned between the base section 13 thereof and its cover 14.

As shown here, for example, the web 68 has at least one localized relatively weaker area 69 so that its length can be reduced if required.

When installing the support 10 in accordance with the invention, the first step is to fit the plate 20.

The positioning member 59 advantageously enables the plate 20 to be located conveniently relative to the base section 13 of the trunking 12.

It also advantageously serves as a reference for cutting the cover 14 to length for installing the trunking cover portion 18.

The cover 21 is then nested over the plate 20.

When the electrical equipment has been wired, the previously assembled trunking cover portion 18 is interengaged with the cover 21 by means of the positioning means 30 provided for this purpose between its end part 18A and the cover 21.

When it is placed in the cover 21, the mechanism of the equipment concerned reinforces the positioning of the trunking cover portion 18 relative to the cover 21 by bearing on the seat 34 of the end part 18A, preventing it from being extracted from the cover 21, and therefore retaining it to the latter.

Obviously, the strip 57 is used if required to compensate for any difference in the dimensions of the mechanism of the equipment concerned and the cover 21.

The end part 18C of the trunking cover portion 18 at the greatest distance from the body 15 clips onto the base section 13 of the trunking 12, which is also beneficial from the point of view of retaining the trunking cover portion 18 as a whole.

In the foregoing description, it has been assumed that the length of the trunking cover portion 18, with its three parts 18A, 18B, 18C, corresponded to the width of the trunking 12.

However, for narrower trunking, not shown, only the two end parts 18A, 18C are used, as shown in FIG. 16.

For wider trunking, also not shown, one or more additional intermediate parts 18B are used as extensions.

The present invention is not limited to the embodiments and/or applications shown but encompasses any variant execution thereof.

In particular, the part of the trunking cover portion nearest the body that it extends can be in one piece with the body if required.

What is claimed is:

1. A support for equipment to be disposed along a trunking projecting from a wall, said support comprising:
    a body adapted to be attached to said wall and to form a casing for said equipment and which has an opening along a side intended to adjoin said trunking; and
    a trunking cover portion extending from said body, in corresponding relationship to said opening thereof, adapted to cover said trunking locally and formed of at least three separate parts staggered lengthwise across a width of said trunking, disposed end-to-end relative to each other and joining to each other at a junction surface substantially parallel to said opening of said body,
    said trunking cover portion at least three parts being namely two end parts and at least one intermediate part,
    complementary assembly means being provided on said two end parts of said trunking cover portion, enabling assembly of said two end parts to adapt said trunking cover to a first predetermined trunking height,
    the intermediate part of said trunking cover portion having at one end an assembly means which is complementary of the assembly means of a first of the two end parts, and at another end another assembly means which is complementary of the assembly means of a second of the two end parts enabling assembly of said intermediate part and said two end parts to adapt said trunking cover portion to a second predetermined trunking height,
    wherein, said body includes two grooves extending along respective lateral edges of the opening and the first of the two end parts includes two ribs in corresponding relationship to the two grooves adapted to be interengaged with the two grooves.

2. A support as claimed in claim 1 wherein said assembly means being of a first type on one of said end parts and of a second type on the other one.

3. The support claimed in claim 2 wherein said intermediate part has assembly means of said first type at one end and assembly means of said second type at the other end.

4. The support claimed in claim 2 wherein said assembly means of said first type include at least one male nesting member and said assembly means of said second type include at least one female nesting member in corresponding relationship thereto.

5. The support claimed in claim 2 wherein said assembly means are substantially parallel to a thickness of said parts of said trunking cover portion.

6. The support claimed in claim 2 wherein at least two of said parts of said trunking cover portion adapted to be butt jointed include engagement means on at least a portion of a contour of a corresponding junction surface and said assembly means alternate with said engagement means.

7. The support claimed in claim 6 wherein said assembly means extend along lateral flanges of the parts concerned and said engagement means extend along their middle part.

8. The support claimed in claim 1 wherein a strip associated with said first end part of said trunking cover portion is adapted to overlie said first end part between said ribs thereof.

9. The support claimed in claim 1 wherein said part of said trunking cover portion at the greatest distance from said body has clipping means projecting from its bottom surface adapted to hook over the base section of said trunking.

10. The support claimed in claim 1 wherein said body includes a plate adapted to be attached to said wall, a cap which incorporates said opening and a front plate which forms a cover.

11. A support for equipment to be disposed along a trunking projecting from a wall, said support comprising:
    a body adapted to be attached to said wall and to form a casing for said equipment and which has an opening along a side intended to adjoin said trunking; and
    a trunking cover portion extending from said body, in corresponding relationship to said opening thereof, adapted to cover said trunking locally and formed of at least three separate parts staggered lengthwise across a width of said trunking, disposed end-to-end relative to each other and joining to each other at a junction surface substantially parallel to said opening of said body,
    said trunking cover portion a t least three parts being namely two end parts and at least one intermediate part,
    complementary assembly means being provided on said two end parts of said trunking cover portion, enabling assembly of said two end parts to adapt said trunking cover to a first predetermined trunking height,
    the intermediate part of said trunking cover portion having at one end an assembly means which is complementary of the assembly means of a first of the two end parts, and at another end another assembly means which is complementary of the assembly means of a second of the two end parts enabling assembly of said intermediate part and said two end parts to adapt said trunking cover portion to a second predetermined trunking height,
    wherein at least two of said parts of said trunking cover portion adapted to be butt jointed include engagement means on a portion of the contour of the corresponding junction surface, and
    said engagement means include a rebate on one of said parts and a tongue on the other of said parts adapted to interengage with said rebate on the first mentioned part.

12. The support claimed in claim 11 wherein said tongue is formed directly by an edge of the part concerned.

13. A support for equipment to be disposed along a trunking projecting from a wall, said support comprising:
- a body adapted to be attached to the wall and to form a casing for the equipment; and
- a trunking cover portion extending from said body and adapted to cover said trunking locally,
- the body having an opening along one side,
- the opening being adapted to adjoin the trunking and the trunking cover portion extending from said body, in a corresponding relationship to the opening thereof,
- the trunking cover being formed of at least two separate parts staggered lengthwise across a width of said trunking, disposed end-to-end relative to each other and joining to each other at a junction surface substantially parallel to the opening of said body,
- at least two of said separate parts of said trunking cover portion being adapted to be butt jointed and including engagement means on at least a portion of a contour of a corresponding junction surface,
- said engagement means including a rebate on one of said parts and a tongue on the other of said parts adapted to interengage with said rebate on the first mentioned part.

14. The support claimed in claim 13 wherein said tongue is formed directly by an edge of the part concerned.

* * * * *